(12) United States Patent
Käll

(45) Date of Patent: Oct. 7, 2014
(10) Patent No.: US 8,856,574 B2

(54) POWER SUPPLY START-UP MECHANISM, APPARATUS, AND METHOD FOR CONTROLLING ACTIVATION OF POWER SUPPLY CIRCUITS

(75) Inventor: Emil Käll, Malmö (SE)

(73) Assignee: Ericsson Modems SA, Le Grand-Saconnex (CH)

( * ) Notice: Subject to any disclaimer, the term of this patent is extended or adjusted under 35 U.S.C. 154(b) by 227 days.

(21) Appl. No.: 13/395,287

(22) PCT Filed: Sep. 23, 2010

(86) PCT No.: PCT/EP2010/064084
§ 371 (c)(1),
(2), (4) Date: Apr. 3, 2012

(87) PCT Pub. No.: WO2011/036227
PCT Pub. Date: Mar. 31, 2011

(65) Prior Publication Data
US 2012/0185720 A1    Jul. 19, 2012

Related U.S. Application Data

(60) Provisional application No. 61/247,736, filed on Oct. 1, 2009.

(30) Foreign Application Priority Data

Sep. 23, 2009 (EP) .................................... 09171083

(51) Int. Cl.
*G06F 1/26* (2006.01)

(52) U.S. Cl.
CPC ....................... *G06F 1/26* (2013.01)
USPC ........................ 713/330; 713/300

(58) Field of Classification Search
CPC ....................................................... G06F 1/26

USPC .................................................. 713/330, 300
See application file for complete search history.

(56) References Cited

U.S. PATENT DOCUMENTS 6,041,414 A    3/2000  Kikuchi
7,529,958 B2 *  5/2009  Roth et al. .................... 713/330
(Continued)

FOREIGN PATENT DOCUMENTS

| CN | 1084294 A | 3/1994 |
| EP | 1 204 119 A2 | 5/2002 |
| EP | 1 890 220 A2 | 2/2008 |

OTHER PUBLICATIONS

International Preliminary Report on Patentability issued in corresponding International application No. PCT/EP2010/064084, date of issuance: Mar. 27, 2012.

(Continued)

*Primary Examiner* — Albert Wang
(74) *Attorney, Agent, or Firm* — Potomac Patent Group PLLC

(57) ABSTRACT

A power supply start-up sequencing mechanism for controlling activation of a plurality of power supply circuits with a predetermined timing is disclosed. The mechanism comprises a time value generator arranged to provide a time value signal; and for each of the power supply circuits, a logic circuit arranged to receive the time value signal and from the received signal provide an activation signal to the respective power supply circuit, wherein the respective logic circuit is associated with a start timing value for the respective power supply circuit such that the activation signal is provided when the associated start timing value coincides with the received time value signal. An apparatus comprising such a mechanism, and a method for controlling activation of a plurality of power supply circuits are also disclosed.

13 Claims, 3 Drawing Sheets

(56) References Cited

U.S. PATENT DOCUMENTS

| | | | |
|---|---|---|---|
| 8,589,704 B2* | 11/2013 | Huynh | 713/300 |
| 2003/0105984 A1 | 6/2003 | Masuyama et al. | |
| 2004/0217750 A1 | 11/2004 | Brown et al. | |
| 2005/0125706 A1 | 6/2005 | Yuan | |
| 2007/0262805 A1 | 11/2007 | Hashimoto et al. | |
| 2008/0122484 A1 | 5/2008 | Zhu et al. | |
| 2008/0307240 A1 | 12/2008 | Dahan et al. | |

OTHER PUBLICATIONS

International Search Report issued in corresponding International Patent Application No. PCT/EP2010/064084, mailing date Dec. 7, 2010.

Written Opinion issued in corresponding International Patent Application No. PCT/EP2010/064084, mailing date Dec. 7, 2010.

* cited by examiner

POWER SUPPLY START-UP MECHANISM, APPARATUS, AND METHOD FOR CONTROLLING ACTIVATION OF POWER SUPPLY CIRCUITS

TECHNICAL FIELD

The present invention relates to a power supply start-up mechanism, and apparatus having such a mechanism, and a method for controlling activation of power supply circuits.

BACKGROUND

During start-up of circuits of an apparatus, it is many times not feasible to start them all at the same time. The reason can be that an electrical power source of the apparatus is not able to supply enough current, or that some parts or the circuitry needs other parts to be up and running for proper start-up.

EP 1890220 A2 discloses a power sequencing circuit which allows sequenced start-up of power supplies. The switching of the sequencer is controlled by a fixed delay between each output switching on. The timing is controlled by an external component to adjust the switching interval. External capacitors and/or resistors are used to determine the switching interval.

However, there is a desire to provide an alternative solution which provides a flexible and low-cost start-up approach.

SUMMARY

The present invention is based on the understanding that provision of logic circuits, e.g. provided by gated and/or combinative networks, provides both flexibility and low cost. Low cost may in this context also be regarded as possibility to implement the circuitry on a small area of silicon. Flexibility may in this context be regarded as the designer's option to give an arbitrary starting timing for a power supply. The inventor has found that, for example, an arrangement comprising a plurality of power supply circuits may in a first environment of interacting circuitry benefit from a first starting sequence with its particular timings, while the arrangement, when used in a second environment of interacting circuitry, may benefit from, or require, a second, i.e. different, starting sequence. The inventor's aim has therefore been to provide flexibility to the designer of the assembly of power supply circuits and interacting circuitry.

According to a first aspect, there is provided a power supply start-up sequencing mechanism for controlling activation of a plurality of power supply circuits with a predetermined timing. The mechanism comprises a time value generator arranged to provide a time value signal; and for each of the power supply circuits, a logic circuit arranged to receive the time value signal and from the received signal provide an activation signal to the respective power supply circuit, wherein the respective logic circuit is associated with a start timing value for the respective power supply circuit and wherein the activation signal is provided when the associated start timing value coincides with the received time value signal.

The associated start timing value may be a register value. The register value may be stored in a non-volatile memory.

The time value signal and the respective start timing values may be binary represented by a plurality of bits.

The time value generator may comprise a counter circuit. The respective logic circuit may comprise a comparator.

According to a second aspect, there is provided an apparatus comprising an electrical power source; a plurality of power supply circuits receiving power from the electrical power source and being arranged to provide power to respective of a plurality of power consuming circuits; and a power supply start-up sequencing mechanism according to the first aspect.

The time value generator may be reset upon start-up of the apparatus such that the time value signal starts from an initial value.

According to a third aspect, there is provided a method for controlling activation of a plurality of power supply circuits of an apparatus with a predetermined timing. The method comprises generating a time value signal;

receiving the time value signal at a logic circuit associated with each of the plurality of power supply circuits; and determining if the time value signal coincides with a start timing value for the respective power supply circuit, and if they coincide, providing an activation signal to the respective power supply circuit.

In some embodiments, an arrangement may comprise other power supply circuits than those subject to the method of the third aspect. In other embodiments, all power supply circuits of an arrangement are subject to the method of the third aspect.

The method may further comprise retrieving the start timing value from a register value, wherein the register value is stored in a non-volatile memory.

The determining whether the start timing value and the time value signal coincides may comprise comparing binary represented, by a plurality of bits, values of the start timing value and the time value signal.

The method may further comprise incrementing a value of the time value signal based on a clock signal. The method may further comprise resetting the value of the time value signal upon starting the apparatus.

DETAILED DESCRIPTION

Figure 1:
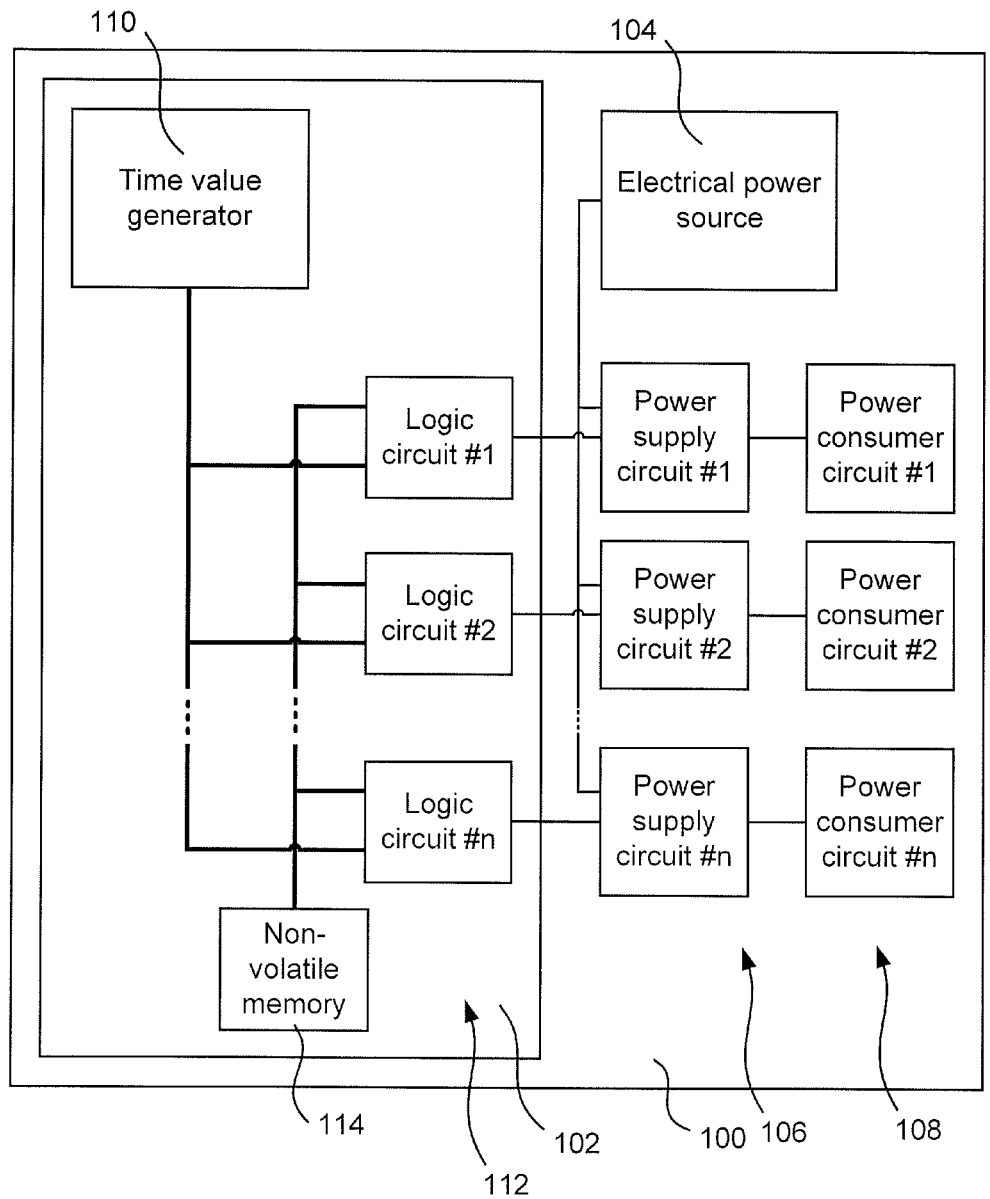
FIG. 1 is a block diagram illustrating an apparatus with a power supply start-up mechanism according to an embodiment.

FIG. 1 is a block diagram illustrating an apparatus 100 with a power supply start-up mechanism 102 according to an embodiment. The apparatus 100 further comprises an electrical power source 104, such as a battery or a connection to an electrical power supply network. There is also a plurality of power supply circuits 106, each providing electrical power to a respective of a plurality of power consumer circuits 108.

The power supply circuits 106 can be DC-to-DC converters delivering specified voltage or current to the respective power consumer circuits 108, which can be radio receivers/transmitter, signal processor, central processing unit, I/O circuit, etc.

The current that the electrical power source 104 can deliver is often limited. For example upon power-up of the apparatus 100, the current required by all the power consumer circuits 108 may exceed the abilities of the electrical power source 104 if they all start at the same time. Thus, activation of the power supply circuits 106 and thus the power consumer circuits 108 are controlled to be activated according to a scheme. The scheme may also be adapted due to that one of the power consumer circuits 108 needs to have another of the power consumer circuits 108 up and running when being activated.

The power supply start-up mechanism 102 comprises a time value generator 110 which generates a time value that is distributed to a plurality of logic circuits 112, i.e. one for each of the power supply circuits 106 to be activated according to the scheme. Thus, there may be power supply circuits (not shown) not being involved in the power-up scheme, e.g. the power supply circuit powering the power supply start-up mechanism 102.

Each of the logic circuits 112 is associated with a start timing value, which can be a register value stored in a non-volatile memory, hard-coded in the logic circuit, or stored in another way such that it is available for the logic circuit upon power-up, i.e. it is always available although the power has been switched off. Preferably, the assigning of the start timing values for the respective logic circuits 112 is made at manufacturing of the apparatus, and then being static. When a logic circuit receives a time value that has reached its start timing value, the logic circuit provides an activation signal to its power supply circuit, which then powers up and starts providing electrical power to the corresponding power consumer circuit.

The approach enables the logic circuit to comprise a rather simple combinative logic network for comparing the start timing value, which e.g. can be a 7-bit value, with the provided time value, which with the example given above also can be represented by 7 bits. For example, at power-up of the apparatus 100, the time value generator 110 is reset to 0000000 and the time value then increments based on a clock value present among the circuits of the apparatus 100, which clock value can be divided by a suitable number. The time value generator can be a counter circuit, and the division of the clock signal is preferably also provided by a counter circuit. Thus, the time value becomes 0000001, then 0000010, and so on. Say logic circuit #1 is assigned start timing value 0000100. When the time value reaches this value, the logic circuit #1, which compares its start timing value with the provided time value, then changes its state of its output from 'disabled' to 'enabled', and this output, i.e. activation signal, causes the power supply circuit #1 to be activated, which can be made by a simple switch controlled by the activation signal. Similar, if logic circuit #2 is assigned start timing value 0000111, the similar process will be started for that logic circuit and its associated power supply circuit a bit later than for logic circuit #1 and its associated power supply circuit.

The approach has several advantages. One of them is that the implementation only requires very limited silicon area, which is particularly advantageous if more or less all the circuitry of the apparatus is provided on a single chip. Another is that it enables a mechanism that can be up and running very quickly after power-up. A further advantage is that it enables a mechanism that in itself requires very little power.

Figure 2:
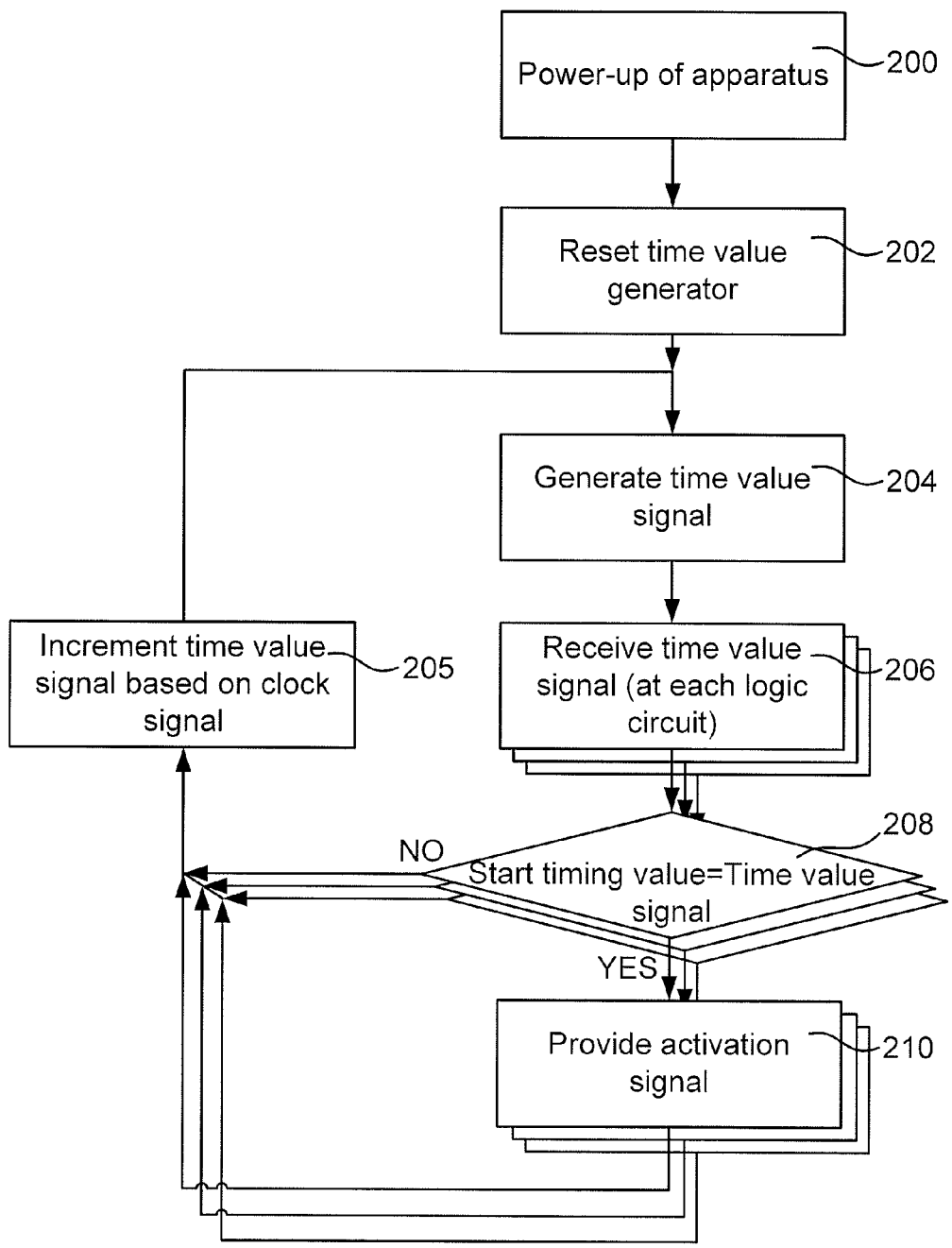
FIG. 2 is a flow chart illustrating a method for controlling activation of power supply circuits according to an embodiment.

FIG. 2 is a flow chart illustrating a method for controlling activation of power supply circuits according to an embodiment. The basic features of the method are to provide a time value signal in a time value generation signal step 204. The time value signal is distributed such that the logic circuits can receive the time value signal in time value reception steps 206. Here, the time value steps are illustrated as a plurality of parallel steps to demonstrate that the reception is made at each of the logical circuits. This parallelism is used in the illustration for the steps where actions are performed independently in branches of logical circuits and their associated power supply circuits and power consumer circuits. Thus, in each of the logical circuits, the respective start timing value is compared with the value of the time value signal in comparison steps 208. If the start timing value coincides with the value of the time value signal, an activation signal is provided in an activation signal provision step 210. The procedure keeps on with new generated time value signals as time goes by, i.e. the time value signal is updated and provided to the logical circuits which receive the signal and compares with their start timing values, and so on, at least until the apparatus is powered-up.

The basic actions have been demonstrated. The update of the generated time value signal can comprise incrementing the time value signal based on a clock signal in a time value increment step 205. For the understanding of the process in the context of power-up of the apparatus, the method can also be considered to comprise a power-up initializing step 200 where e.g. the apparatus is switched on by a user or woken up by another event from a sleep-mode. Preferably, the time value of the time value signal generator is reset in a time value reset step 202 such that the generation of proper time value signal can commence in the time value signal generation step 204, and the procedure can work according to the basic features demonstrated above.

Figure 3:
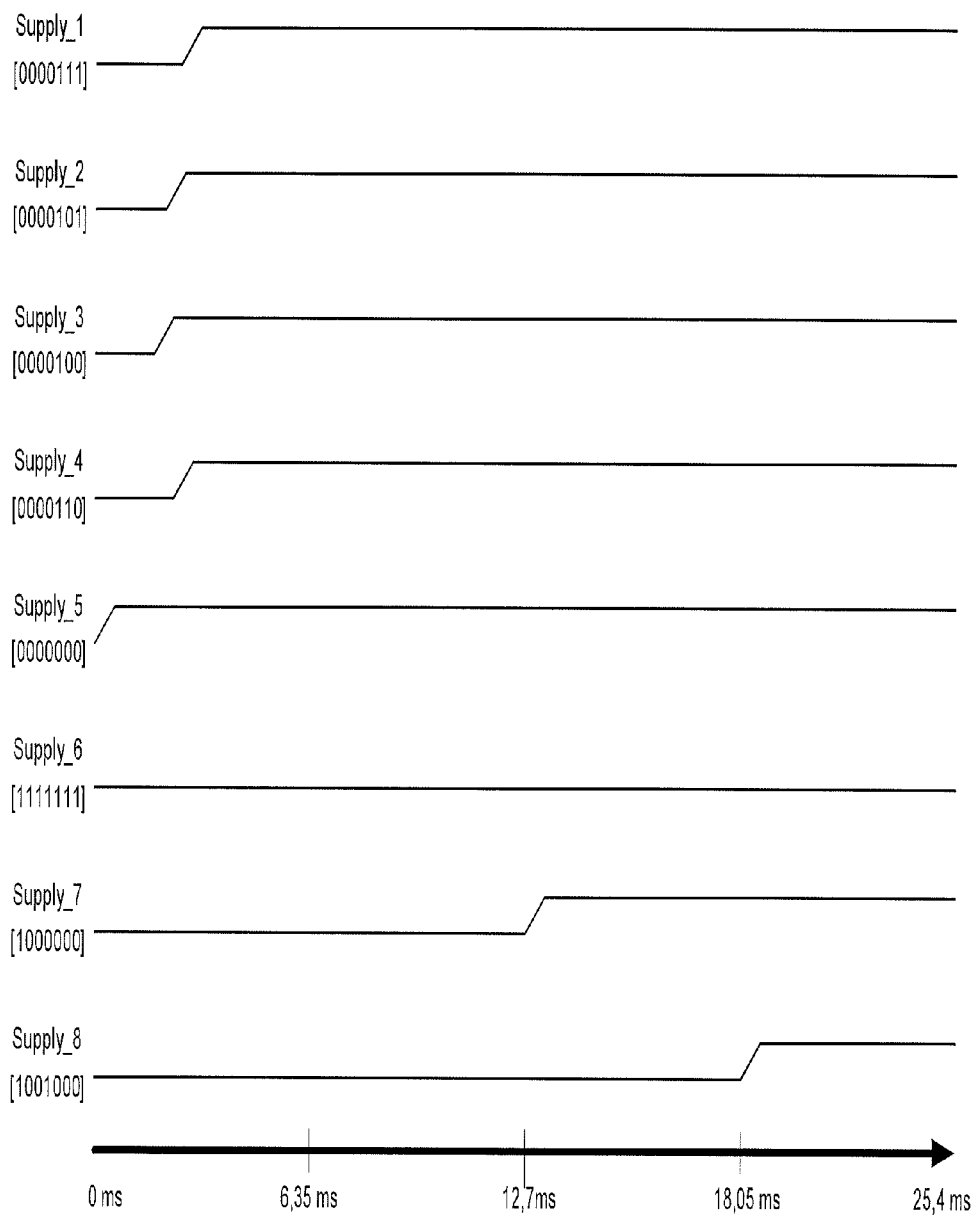
FIG. 3 schematically illustrates an example of a signal scheme of activation signals.

FIG. 3 schematically illustrates an example of a signal scheme of activation signals, where a "low" value indicates "disabled" and a "high" value indicates "enabled", i.e. activation of corresponding power supply circuit. The time value is on the horizontal axis, while the different branches of logical circuits and their associated power supply circuits and power consumer circuits are distributed on the vertical axis, which also for each branch is the activation signal value. Here, we can also see an optional feature, where a reserved start timing value, here 1111111, means that the branch, here Supply_6, is disabled regardless of the value of the time value signal, which preferably is not allowed to reach the reserved value. This value can be set by factory e.g. for disabling parts of a chip used for several products, or it can be assigned this as an override value for certain start conditions, e.g. disabling radio circuits in a "flight mode".

The invention claimed is:

1. A power supply start-up sequencing mechanism for controlling activation of a plurality of power supply circuits with a predetermined timing, the mechanism comprising;
   a time value generator arranged to provide a time value signal; and
   for each of the power supply circuits, a logic circuit arranged to receive the time value signal, and from the received signal, provide an activation signal directly to its respective power supply circuit, wherein the activation signals collectively control a startup sequence encompassing all of said plurality of power supply circuits, wherein
   the respective logic circuit is associated with a start timing value for the respective power supply circuit and wherein
   the activation signal is provided when the associated start timing value coincides with the received time value signal.

2. The mechanism according to claim 1, wherein the associated start timing value is a register value.

3. The mechanism according to claim 2, wherein the register value is stored in a non-volatile memory.

4. The mechanism according to claim 1, wherein the time value signal and the respective start timing values are binary represented by a plurality of bits.

5. The mechanism according to claim 1, wherein the time value generator comprises a counter circuit.

6. The mechanism according to claim 1, wherein the respective logic circuit comprises a comparator.

7. An apparatus comprising;
an electrical power source;
a plurality of power supply circuits receiving power from the electrical power source and being arranged to provide power to respective of a plurality of power consuming circuits; and
a power supply start-up sequencing mechanism according to claim 1.

8. The apparatus according to claim 7, wherein the time value generator is reset upon start-up of the apparatus such that the time value signal starts from an initial value.

9. A method for controlling activation of a plurality of power supply circuits of an apparatus with a predetermined timing, the method comprising;
generating a time value signal;
receiving the time value signal at a logic circuit associated with each of the plurality of power supply circuits; and
determining if the time value signal coincides with a start timing value for the respective power supply circuit, and if they coincide, providing an activation signal directly to the respective power supply circuit, wherein the activation signals collectively control a startup sequence encompassing all of said plurality of power supply circuits.

10. The method according to claim 9, further comprising retrieving the start timing value from a register value, wherein the register value is stored in a non-volatile memory.

11. The method according to claim 9, wherein the determining of whether the start timing value and the time value signal coincide comprises comparing binary values represented, by a plurality of bits, values of the start timing value and the time value signal.

12. The method according to claim 9, further comprising incrementing a value of the time value signal based on a clock signal.

13. The method according to claim 12, further comprising resetting the value of the time value signal upon starting the apparatus.

* * * * *